(12) United States Patent
Cruz-Hernandez et al.

(10) Patent No.: US 10,175,761 B2
(45) Date of Patent: Jan. 8, 2019

(54) HAPTIC OUTPUT DEVICE AND METHOD OF GENERATING A HAPTIC EFFECT IN A HAPTIC OUTPUT DEVICE

(71) Applicant: Immersion Corporation, San Jose, CA (US)

(72) Inventors: Juan Manuel Cruz-Hernandez, Montreal (CA); Danny A. Grant, Laval (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 15/632,644

(22) Filed: Jun. 26, 2017

(65) Prior Publication Data

US 2017/0293360 A1 Oct. 12, 2017

Related U.S. Application Data

(63) Continuation of application No. 15/078,335, filed on Mar. 23, 2016, now Pat. No. 9,983,674, which is a continuation of application No. 13/605,589, filed on Sep. 6, 2012, now Pat. No. 9,323,326.

(60) Provisional application No. 61/531,251, filed on Sep. 6, 2011.

(51) Int. Cl.
*G06F 3/01* (2006.01)
*G06F 3/041* (2006.01)
*G06F 3/044* (2006.01)

(52) U.S. Cl.
CPC .............. *G06F 3/016* (2013.01); *G06F 3/044* (2013.01); *G06F 3/0416* (2013.01); *G06F 2203/04104* (2013.01)

(58) Field of Classification Search
None
See application file for complete search history.

(56) References Cited

U.S. PATENT DOCUMENTS

| | | |
|---|---|---|
| 5,149,918 A | 9/1992 | Kozik et al. |
| 7,088,342 B2 | 8/2006 | Rekimoto et al. |
| 7,205,978 B2 | 4/2007 | Poupyrev et al. |
| 7,446,456 B2 | 11/2008 | Maruyama et al. |
| 7,456,823 B2 | 11/2008 | Poupyrev et al. |
| 7,522,152 B2 | 4/2009 | Olien et al. |
| 7,554,246 B2 | 6/2009 | Maruyama et al. |

(Continued)

FOREIGN PATENT DOCUMENTS

| | | |
|---|---|---|
| CN | 1924775 A | 3/2007 |
| CN | 101645960 A | 2/2010 |

(Continued)

OTHER PUBLICATIONS

Smith, Ned, "Feel the future: Touch screens that touch back", MSNBC [online], [retrieved Apr. 21, 2011]. Retrieved from be Internet <URL: http://www.msnbc.com/clearprint/CleanPrintProxy.aspx?unique=1303408902146>.

(Continued)

*Primary Examiner* — Nicholas Lee
(74) *Attorney, Agent, or Firm* — Medler Ferro Woodhouse & Mills PLLC

(57) ABSTRACT

A haptic output device includes a touch surface, a sensor configured to sense an input at the touch surface, and a controller configured to read the sensor, identify a location of the input, switch from a read mode to a write mode, and write a voltage based on the location of the input to generate an electrostatic output.

18 Claims, 5 Drawing Sheets

(56) References Cited

U.S. PATENT DOCUMENTS

| | | | |
|---|---|---|---|
| 7,663,604 | B2 | 2/2010 | Maruyama et al. |
| 7,755,607 | B2 | 7/2010 | Poupyrev et al. |
| 8,805,517 | B2 | 8/2014 | Radivojevic et al. |
| 2008/0062145 | A1 | 3/2008 | Shahoian et al. |
| 2008/0088580 | A1 | 4/2008 | Poupyrev et al. |
| 2009/0079550 | A1 | 3/2009 | Makinen et al. |
| 2009/0109007 | A1 | 4/2009 | Makinen et al. |
| 2009/0227296 | A1 | 9/2009 | Kim |
| 2009/0322496 | A1 | 12/2009 | da Costa |
| 2009/0322695 | A1 | 12/2009 | Cho et al. |
| 2010/0085169 | A1 | 4/2010 | Poupyrev et al. |
| 2010/0127819 | A1 | 5/2010 | Radivojevic et al. |
| 2010/0152794 | A1 | 6/2010 | Radivojevic et al. |
| 2010/0231539 | A1 | 9/2010 | Cruz-Hernandez et al. |
| 2010/0250071 | A1 | 9/2010 | Pala et al. |
| 2011/0025635 | A1 | 2/2011 | Lee |
| 2011/0115734 | A1 | 5/2011 | Harashima et al. |
| 2011/0163946 | A1 | 7/2011 | Tartz et al. |
| 2011/0285667 | A1 | 11/2011 | Poupyrev et al. |
| 2012/0026114 | A1 | 2/2012 | Lee et al. |
| 2012/0268412 | A1 | 10/2012 | Cruz-Hernandez et al. |
| 2014/0375580 | A1 | 12/2014 | Peshkin |

FOREIGN PATENT DOCUMENTS

| | | | |
|---|---|---|---|
| JP | 2006251948 | A | 9/2006 |
| JP | 2011-129091 | | 6/2011 |
| JP | 2011523111 | A | 8/2011 |
| KR | 20110097944 | A | 8/2011 |
| WO | 2009037379 | A1 | 3/2009 |
| WO | 2009141502 | A1 | 11/2009 |

OTHER PUBLICATIONS

Greene, Kate, "A Touch Screen with Texture", Technology Review [online], [retrieved Apr. 21, 2011]. Retrieved from the Internet <URL: http://www.technologyreview.com/printer_friendly_article.aspx?id=26506>.

Bonderud, Doug, "Nokia Files Patent to Make Phones Digitally Stimulating", InventorSpot.com [online], [retrieved Apr. 21, 2011]. Retrieved from the Internet <URL: http://inventorspot.com/articles/nokia_files_patent_make_phones_digitally_stimulating>.

Marks, Paul, "Nokia touchscreen creates texture illusion", New Scientist [online], [retrieved Apr. 21, 2011]/ Retrieved from the Internet <URL: http://www.newscientist.com/article/dn19510-nokia-touchscreen-creates-texture-illusion.html>.

Any information that are not included with this Information Disclosure Statement can be found in U.S. Appl. No. 15/078,335.

Notice of Allowance dated Nov. 29, 2017 in corresponding Japanese Patent Application No. 2016-216358.

Non-Final Office Action issued in U.S. Appl. No. 15/078,335, dated Jul. 27, 2017.

Corrected Notice of Allowance dated Mar. 7, 2018 in co-pending U.S. Appl. No. 15/078,335.

Corrected Notice of Allowance and Response to Rule 312 Communication dated Apr. 27, 2018 in co-pending U.S. Appl. No. 15/078,335.

Office Action dated May 28, 2018 in corresponding Chinese Patent Application No. 201610749185.5.

Examination Report in EP Appl. 12829966.6 dated Sep. 7, 2018.

Office Action dated Oct. 29, 2018 in corresponding Korean Patent Application No. 10-2018-7023849.

us 10,175,761 B2

HAPTIC OUTPUT DEVICE AND METHOD OF GENERATING A HAPTIC EFFECT IN A HAPTIC OUTPUT DEVICE

CROSS-REFERENCE TO RELATED APPLICATIONS

This application is a continuation of U.S. patent application Ser. No. 15/078,335, filed Mar. 23, 2016, now issued as U.S. Pat. No. 9,983,674 on May 29, 2018, which is a continuation of U.S. patent application Ser. No. 13/605,589, filed Sep. 2, 2012, now issued as U.S. Pat. No. 9,323,326 on Apr. 26, 2016, which claims the benefit of priority from U.S. Provisional Patent Application No. 61/531,251, filed Sep. 6, 2011, the entire content of all are incorporated herein by reference.

FIELD

The present invention is related to a haptic output device and a method of generating a haptic effect in a haptic output device.

BACKGROUND

Touch sensitive surfaces, also known as touch surfaces, are used in a variety of applications. For example, a touch surface may be provided by a touch screen, for example a capacitive touch screen, a touch pad, for example in a laptop, or an automotive controller. Touch surfaces do not typically provide haptic effects to the users of the touch surfaces. It is desirable to provide a haptic output device that provides haptic effects when a user interacts with the touch surface of the haptic output device.

SUMMARY

According to an aspect of the present invention, there is provided a haptic output device that includes a touch surface; a sensor configured to sense an input at the touch surface; and a controller configured to read the sensor, identify a location of the input, switch from a read mode to a write mode, and write a voltage based on the location of the input to generate an electrostatic output.

In an embodiment of the haptic output device, the haptic output device includes a touch screen comprising the touch surface.

In an embodiment of the haptic output device, the touch screen is a capacitive touch screen.

In an embodiment of the haptic output device, the controller is configured to write the voltage to an entire area of the capacitive touch screen.

In an embodiment of the haptic output device, the controller is configured to write the voltage to an area proximate the location of the input.

In an embodiment of the haptic output device, the sensor is configured to sense a plurality of inputs, and wherein the controller is configured to identify locations of the inputs on the touch surface.

In an embodiment of the haptic output device, the controller is configured to write the voltage to areas corresponding to the locations of the inputs to generate a plurality of localized electrostatic outputs.

In an embodiment of the haptic output device, the capacitive touch screen comprises an insulating outer layer comprising the surface, and an electrode proximate the insulating outer layer, wherein the electrode is configured to generate the electrostatic output.

In an embodiment of the haptic output device, the haptic output device includes a plurality of electrodes proximate the insulating outer layer, wherein the controller is configured to drive at least one electrode of the plurality of electrodes closest to the location of the input to generate the electrostatic output.

In an embodiment of the haptic output device, the haptic output device includes a plurality of electrodes proximate the insulating outer layer, wherein the controller is configured to drive different electrodes of the plurality of electrodes to generate multi-touch localized electrostatic outputs.

In an embodiment of the haptic output device, the haptic output device includes a plurality of electrodes proximate the insulating outer layer, wherein the controller is configured to write the voltage to one of the plurality of electrodes proximate a first location, then write the voltage to another one of the plurality of electrodes proximate a second location to transition the electrostatic output from the first location to the second location as the input is moved from the first location to the second location.

In an embodiment of the haptic output device, the controller is configured to modulate an overall power delivered by each electrode of the plurality of electrodes according to a current location of the input.

In an embodiment of the haptic output device, the overall power delivered by each electrode is a function of the location of the input relative to each electrode.

According to an aspect of the present invention, there is provided a method for generating a haptic effect at a surface of a haptic output device comprising a touch surface. The method includes sensing an input on the touch surface with a sensor; reading a first voltage from the sensor sensing the input on the touch surface with a controller; determining a location of the input with the controller; switching the controller from a read mode to a write mode; and writing a second voltage based on the sensed location of the input, with the controller, to generate an electrostatic output.

In an embodiment of the method, the touch surface is provided by a capacitive touch screen.

In an embodiment of the method, the writing comprises writing the second voltage to an entire area of the capacitive touch screen.

In an embodiment of the method, the writing comprises writing the second voltage to an area proximate the sensed location.

In an embodiment of the method, the sensing comprises sensing a plurality of inputs and locations of the inputs on the touch surface.

In an embodiment of the method, the writing comprises writing the second voltage to areas corresponding to the locations of the inputs to generate a plurality of localized electrostatic outputs.

In an embodiment of the method, the capacitive touch screen comprises an insulating outer layer comprising the touch surface, and an electrode proximate the insulating outer layer. The electrode is configured to generate the electrostatic output.

In an embodiment of the method, the capacitive touch screen comprises a plurality of electrodes proximate the insulating outer layer, and the method includes driving at least one electrode of the plurality of electrodes, with the controller, closest to a location to generate the electrostatic output.

In an embodiment of the method, the capacitive touch screen comprises a plurality of electrodes proximate the insulating outer layer, and the method comprises driving different electrodes of the plurality of electrodes, with the controller, to generate multi-touch localized electrostatic outputs.

In an embodiment of the method, the capacitive touch screen comprises a plurality of electrodes proximate the insulating outer layer, and the method includes writing the second voltage to one of the plurality of electrodes proximate a first location, with the controller, sensing a second input at a second location with a sensor, determining the second location with the controller, and writing the second voltage to another one of the plurality of electrodes proximate the second location to transition the electrostatic output from the first location to the second location as the input is moved from the first location to the second location.

In an embodiment of the method, the method includes modulating, with the controller, an overall power delivered by each electrode according to a current location of the input.

In an embodiment of the method, the overall power delivered by each electrode is a function of the location of the input relative to each electrode.

In an embodiment of the method, the method includes measuring impedance at the touch surface at the location of the input, and adjusting the writing the second voltage to adjust the electrostatic output.

In an embodiment of the method, the impedance is measured by the sensor.

According to an aspect of the present invention, there is provided a method for generating a haptic effect at a surface of a haptic output device comprising a touch surface. The method includes sensing an input on the touch surface with a sensor; reading a first voltage from the sensor sensing the input on the touch surface with a controller; determining a location of the input with a controller; and writing a second voltage based on the sensed location of the input to generate an electrostatic output with the controller.

In an embodiment of the method, the second voltage is about the same as the first voltage.

In an embodiment of the method, the second voltage comprises a dynamic voltage value.

In an embodiment of the method, the touch surface is provided by a capacitive touch screen comprising a plurality of electrodes, and the writing the second voltage comprises writing the second voltage to at least one electrode proximate the location of the input.

In an embodiment of the method, the method includes measuring impedance at the touch surface at the location of the input, and adjusting the writing the second voltage to adjust the electrostatic output.

In an embodiment of the method, the impedance is measured by the sensor.

The embodiments described in the present disclosure may include various features and advantages, which may not necessarily be expressly disclosed herein but will be apparent to one of ordinary skill in the art upon examination of the following detailed description and accompanying drawings. It is intended that these features and advantages be included within the present disclosure.

BRIEF DESCRIPTION OF THE DRAWINGS

The components of the following figures are illustrated to emphasize the general principles of the present disclosure and are not necessarily drawn to scale.

Reference characters designating corresponding components are repeated as necessary throughout the figures for the sake of consistency and clarity.

DETAILED DESCRIPTION

Figure 1:
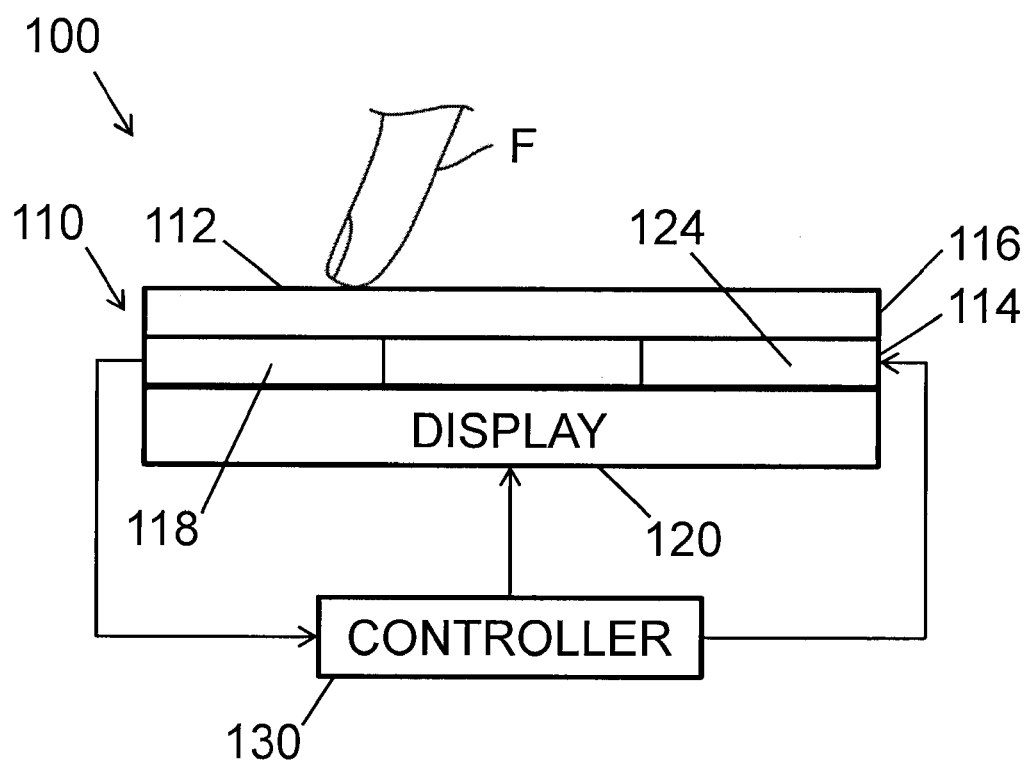
FIG. 1 schematically illustrates a haptic output device in accordance with an embodiment of the present invention.

FIG. 1 illustrates an embodiment of a user interface in the form of a haptic output device 100 configured to provide a haptic effect to a user of the haptic output device 100. The haptic output device 100 may be, for example, part of tablet, a phone, a music player, a video player, a graphic display, an e-book reader, a gamepad, a touch pad, an automotive dashboard, a steering wheel, some combination of the aforementioned devices, or may be some other general device that includes a user interface. As illustrated in FIG. 1, the haptic output device 100 includes a touch screen 110 having a touch surface 112, a display 120 beneath the touch screen 110, and a controller 130, which are described in further detail below. Although the embodiments described herein are directed to a haptic output device 100 that includes a touch screen, it should be understood that other embodiments within the scope of the present invention may not include a display and a touch screen, but instead include the touch surface 112 without the touch screen. The illustrated embodiment discussed herein should not be considered to be limiting in any way.

A haptic effect refers to a stimulus or force, including but not limited to a vibration, an attractive or repulsive force, a voltage or current, some other mechanical or electromagnetic force, heating or cooling, or some other stimulus. The haptic effect may comprise one force or stimulus or a combination of forces and/or stimuli. A plurality of haptic effects may be combined to form an overall haptic effect. The haptic effect may be output to provide feedback to a user or object interacting with the haptic output device 100. The haptic effect may provide feedback through an electrostatic output. In an embodiment, the electrostatic output may be used to generate a force on an object, like a finger at the user interface, to simulate a friction force as the finger is moved while in contact with the haptic output device 100 at the user interface. In an embodiment, the electrostatic output may be used to send an electric signal, e.g., a voltage or current, to an object that can perceive the signal, like a nerve of the finger or a sensor in a stylus, which can provide a texture effect to the user.

In an embodiment, the touch screen 110 is a capacitive touch screen. In an embodiment, the touch screen is a surface capacitive touch screen. In an embodiment, the touch screen 110 is a projected capacitive touch screen.

As illustrated in FIG. 1, the touch screen 110 may include a conductive layer 114 and an insulating layer 116. The conductive layer 114 may include any semiconductor or other conductive material, such as copper, aluminum, gold, silver, conductive polymers, carbon nanotubes, etc. The conductive layer 114 may include a sensor 118 or a plurality of sensors. The insulating layer 116 may be glass, plastic, polymer, or any other insulating material.

The haptic output device 100 interfaces with the user by being configured to sense an input, which may be an object that is touching the touch surface 112 of the touch screen 110, with the sensor 118. The object may be a user's finger F, as illustrated in FIG. 1, a palm of the user's hand, or any other part of the user's body that can sense a haptic effect. The object may also be a stylus or some other device that can be sensed to be touching the surface 112 of the touch screen 110. The haptic output device 100 may sense the presence of the object touching the surface 112 of the touch screen 110 through capacitive, resistive, or inductive coupling, but is not limited to those techniques.

The controller 130 may provide an electric signal to the conductive layer 114. The electric signal may be an AC or time varying signal that capacitively couples the conductive layer 114 with an object near or touching the touch screen 110. The AC signal may be generated by a high-voltage amplifier. The haptic output device 100 may also rely on principles other than or in addition to capacitive coupling to generate a haptic effect. The capacitive coupling may generate a haptic effect by stimulating parts of the object near or touching the touch screen 110, such as mechanoreceptors in the skin of a user's finger F or components in a stylus that can respond to the coupling. The mechanoreceptors in the skin, for example, may be stimulated and sense the capacitive coupling as a vibration or some more specific sensation, which may simulate a texture or friction force, particularly when the finger F is moved across the surface 112 of the touch screen. For example, the conductive layer 114 may be applied with an AC voltage signal from the controller 130 that couples with conductive parts of a user's finger F.

In an embodiment, the capacitive coupling may be provided to generate an electrostatic output. In an embodiment, the capacitive coupling may be provided to simulate a friction force or texture on the surface 112 of the touch screen 110. A friction force is simulated in that while the surface 112 of the touch screen 110 may be smooth, the capacitive coupling may produce an attractive force between an object near the touch screen 110 and the conductive layer 114. The attractive force increases the friction on the surface 112 even when the topography of the material at the surface 112 has not changed. Varying the levels of attraction between the object and the conductive layer 114 may vary the friction on an object moving across the surface 112 of the touch screen 110. Varying the friction force simulates a change in the coefficient of friction.

As the user touches the touch screen 110 and moves his or her finger F on the touch screen 110, the user may sense a texture of prickliness, graininess, bumpiness, roughness, stickiness, an edge, a button, or some other texture via the electrostatic outputs that are generated. Texture does not have a coefficient of friction change on the surface 112, but instead is created by specific sensations that are sensed by the user's skin mechanoreceptors. The user's skin mechanoreceptors may also be stimulated to have a general sensation as the finger F moves across the touch screen 110. Therefore, the capacitive coupling may be used to simulate a friction force or texture by generating a signal that couples with an object near or touching the touch screen 110.

To provide the same attractive force or to provide the same level of stimuli across many different objects or persons, the sensor 118 and/or controller 130 may measure the impedance at the surface 112 of the touch screen 110. The sensor 118 and/or controller 130 may measure the impedance by applying a pulse across the surface 112 and measuring the surface voltage or by measuring the strength of the capacitive coupling. The sensor 118 and/or controller 130 may use other known techniques for measuring impedance, and may compensate for varying ambient conditions such as the moisture in the air or temperature. The haptic effect may be adjusted based on the impedance of a person. For example, a more forceful haptic effect may be applied to an object with higher impedance and a less forceful effect for an object with lower impedance.

In an embodiment, the touch screen 110 may not have an insulating layer, so that an object can directly touch the conductive layer 114. A haptic effect may be generated by passing an electrical current from the conductive layer 114 to the object.

Figure 2:
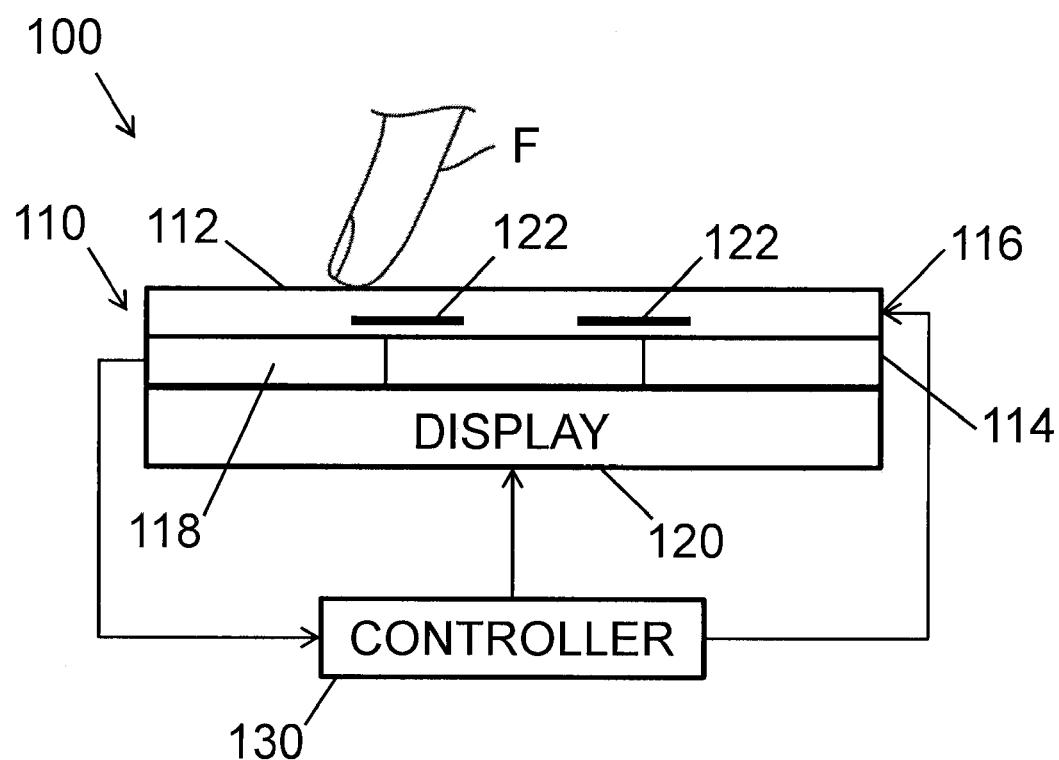
FIG. 2 schematically illustrates the haptic output device in accordance with an embodiment of the present invention.

As illustrated in FIG. 2, in an embodiment, the insulating layer 116 may include one or more electrodes 122 in the insulating layer 116 that can pass current to objects that touch the surface 112 of the touch screen 110 at a location proximate to the electrode(s) 122 as the objects move across the insulating layer 116.

As illustrated in FIG. 1, in an embodiment, the conductive layer 114 may include one or more electrodes 124 that can generate an electrostatic output to objects that touch the surface 112 of the touch screen 110 at a location proximate to the electrode(s) 124 as the objects move across the insulating layer 116. In an embodiment, an electrode that is part of the sensor 118 may generate an electrostatic output.

Figure 3:
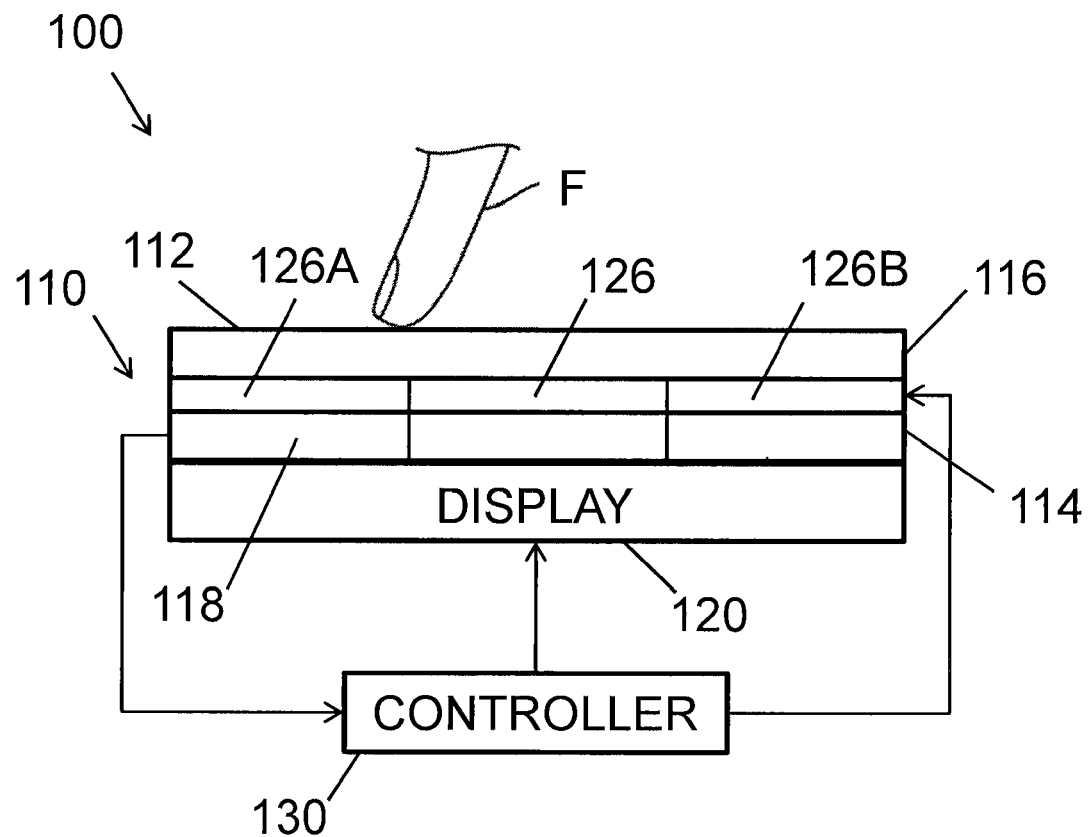
FIG. 3 schematically illustrates the haptic output device in accordance with an embodiment of the present invention.

As illustrated in FIG. 3, in an embodiment, one or more electrodes 126, 126A, 126B may be located in between the conductive layer 114 and the insulating layer 116. The one or more electrodes 126, 126A, 126B may generate an electrostatic output to the objects that touch the surface 112 of the touch screen 110 at a location proximate to the electrode(s) 126, 126A, 126B as the objects move across the insulating layer 116.

The controller 130 is configured to read an output of the sensor 118, which may be a voltage, and to identify a location of the input that was sensed by the sensor 118 via the output of the sensor 118 when the controller 130 is in a read mode. The controller 130 is also configured to operate in a write mode in which the controller 130 writes a signal, which may be a voltage, to an electrode, such as the electrode 124 in the conductive layer 114 (see FIG. 1) or the electrode 122 in the insulating layer 116 (see FIG. 2) or the electrode 126 in between the conductive layer 114 and the insulating layer 116 (see FIG. 3), to generate an electrostatic charge on, for example, the user's finger F. The electrostatic charge may be felt as an electrostatic output, which provides the haptic effect. The strength of the electrostatic output may depend, among other things, on the thickness of the insulating layer 116 that separates the electrode 122, 124, 126 from the skin of the user's finger F.

Figure 4:
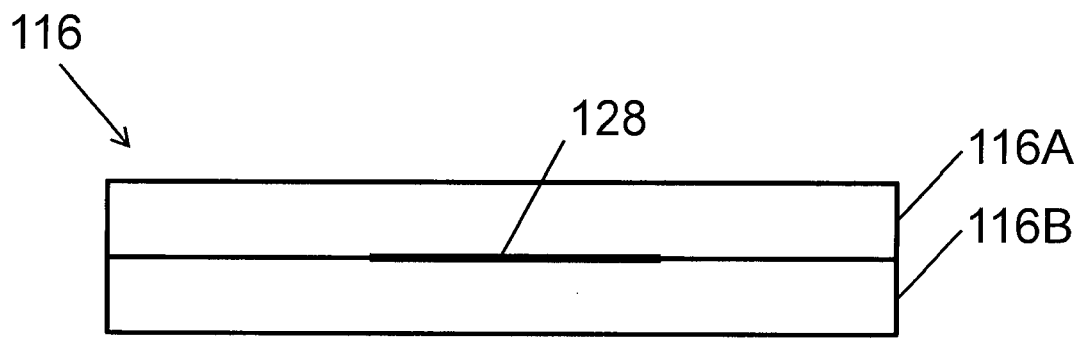
FIG. 4 schematically illustrates an embodiment of an insulating layer of the haptic output device of FIG. 2.

In an embodiment illustrated in FIG. 4, the insulating layer 116 may include an outer insulating layer 116A that may be used to improve the strength and durability of the touch screen 110. In an embodiment, the outer insulating layer 116A comprises glass. In an embodiment, the outer insulating layer 116A comprises a thermoplastic. In an embodiment, a second insulating layer 116B is provided in addition to the outer insulating layer 116A. In an embodiment, the second insulating layer 116B comprises glass. In an embodiment, the outer insulating layer 116A comprises a thermoplastic having a thickness of less than 0.5 mm, and the second insulating layer 116B comprises glass. In an embodiment, the insulating layer 116 is a single layer of glass. In an embodiment, an electrode 128 proximate to the outer insulating layer 116A may be used specifically for generating electrostatic outputs. Additional, dedicated electronics for driving the electrostatic outputs in the electrode 128, and also to coordinate the reading of the position and writing to the electrostatic electrode 128 may be provided to minimize and even avoid potential capacitive sensing issues.

In an embodiment, the controller 130 is configured to switch from a read mode in which the input or touch is sensed to a write mode in which a voltage is written or provided to generate an electrostatic charge and electrostatic output on the touching finger F. The voltage may be written to at least one of the electrodes 122, 124, 126, 128 described above. This way, the haptic output device 100 is configured to multiplex between the sensing of the touch and the writing of the voltage to generate an electrostatic change and electrostatic output on the touching finger F.

In an embodiment, electrostatic outputs may be implemented by multiplexing between reading the sensor 118 that senses a touch and writing voltage to create the haptic effect. The voltage may be written to at least one of the electrodes 122, 124, 126, 128 described above. This may be a general technique for both surface capacitive touch screens and projected capacitive touch screens.

In an embodiment, multiplexing may be used between the sensing of the touch and the writing of the voltage to generate an electrostatic charge on the touching finger F. For surface capacitive touch screens, the method may include reading the sensor 118 that has sensed a touch, switching from reading to writing, writing a desired voltage based on the sensed location of the touch to create an electrostatic output, returning to reading the sensor 118, etc. The desired voltage may be written to at least one of the electrodes 122, 124, 126, 128 described above.

For projected capacitive touch screens, the method may include reading the sensor 118 that has sensed a touch, obtaining a location of the touch, switching from reading to writing (e.g., sensing to actuation), and writing a desired voltage to the area around the touch location. Because projected capacitive touch screen technology allows for multi-touch, different locations can be selected, and electrostatic outputs may be applied to the specific locations without writing to the whole touch surface area. The method may be repeated with the reading of another touch, etc.

The timing for the switching between the reading and writing (sensing and actuating) modes of the controller 120 may depend on the settling time of the signals.

In embodiments in which the touch screen 110 comprises multiple electrodes, the ordering of the reading and writing may be adjusted. For example, in an embodiment, reading from a first electrode 126A while writing to a second electrode 126B (see FIG. 3) may occur simultaneously.

In an embodiment, a higher voltage may be used while sensing a touch to minimize and even avoid the need to set the read and write voltages to two different levels. Typically, the electronics drivers use a small voltage for sensing, but this voltage may potentially be high enough to generate electrostatic outputs. For a surface capacitive touch screen and a projected capacitive touch screen, an embodiment of a method may include reading a touch position using traditional voltage levels, determining a touch location, and at the touch location, reading the touch position by using electrostatic output voltage levels. Because voltage levels will be dynamic for electrostatic outputs, the processing of the sensing may be done by using this dynamic value. A potential advantage of this embodiment would be to minimize the time required to wait for settling voltages between the read and write cycles.

For projected capacitive touch screens, the output may be localized, because different locations are known and may be accessed separately.

In an embodiment, the controller 130 may actively track the current voltage level for the read cycle, and adjust the value accordingly to determine an accurate location of the input. In an embodiment, some electrodes 140 may be read with normal voltage and other electrodes 140 may be read with a higher voltage than the normal voltage.

If the area covered by the conducting layer 114 that includes at least one electrode 124 in a projected capacitive touch screen is too small, the size may be modified in order to have a larger area to produce electrostatic outputs. The haptic effect may be modulated as a function of the area covered by the electrode, or as a function of the number of electrodes. For example, if different users with different finger sizes use the same touch screen 110, or if a single user touches the touch screen 110 with multiple fingers having different contact areas, such as a pinky and a thumb, the contact area information can be used to adjust the magnitude of the haptic effect so that each finger perceives the same haptic effect.

In an embodiment, a plurality of electrodes may be used instead of a single electrode in order to create the haptic effect. In an embodiment, after the user input has been sensed, and the controller 130 may be used to determine the optimum output location to minimize power or isolate the haptic effect to a specific location. After the optimum output location has been determined, the controller 130 may send signal to drive the electrode closest to the optimum output location.

In an embodiment, a user may provide multiple inputs to the touch screen 110 with, for example, two or more fingers at two different locations. After the inputs have been sensed, the controller 130 may be used to drive different electrodes at different locations separately to create multi-touch localized haptic effects. For example, the localized haptic effects may be provided so that one finger feels a stronger haptic effect than the other finger, or as the fingers are moved closer to one another across the surface 112 of the touch screen 110, the haptic effect may change based on location of one finger relative to the other.

In an embodiment, the controller 130 may be configured to transition haptic effects from one electrode to the other as the user's finger moves from electrode to electrode, and modulate the overall power delivered by each electrode according to the current location of the user's finger. For example, the power delivered to the finger by each electrode may be a function of the finger's location relative to the electrode. If the finger is located over a first electrode, the power delivered by the first electrode may be at level X to generate haptic effect A. If the finger is located over a second electrode, the power delivered by the second electrode may be at level Y to generate haptic effect B. If the finger is located in between the first electrode and the second electrode, the power delivered to the first electrode may be one-half of level X and the power delivered to the second electrode may be one-half of level Y to generate haptic effect C. In an embodiment, level X and level Y may be the same or substantially the same, and haptic effects A, B, and C may be the same or substantially the same, so that the haptic effect felt by the user is consistent across the surface 112 of the touch screen 110.

The haptic effects may be generated one at a time, or can be combined. For example, a voltage may be applied to the conductive layer 114 at a level high enough to both attract the skin of a finger F touching the touch screen 110 and to stimulate mechanoreceptors within the skin. Simultaneous to this haptic effect, electrostatic forces may be produced on the conductive layer 114 and the insulating layer 116 (that includes electrodes) to create mechanical motion in those layers.

Figure 5:
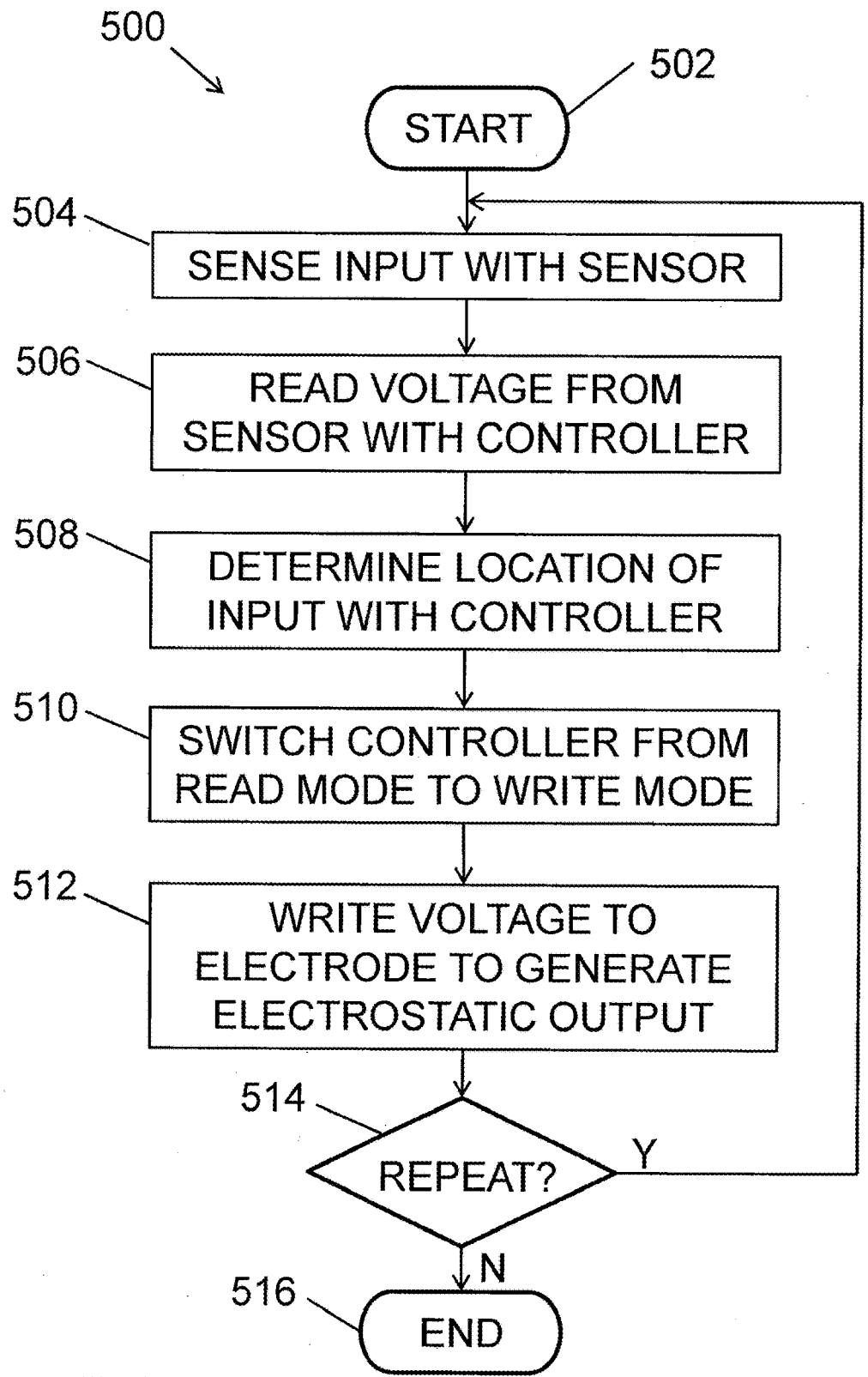
FIG. 5 is a flow diagram of a method for generating a haptic effect at a surface of a haptic output device.

FIG. 5 illustrates a method 500 for generating a haptic effect in a haptic output device in accordance with an embodiment of the invention. The method 500 begins at 502. At 504, an input on the surface 112 of the touch screen 110 is sensed with a sensor 118. At 506, a voltage is read from the sensor 118 that senses the input on the surface 112 of the touch screen 110 by the controller 130. At 508, the location of the input is determined by the controller 130. At 510, the controller 130 is switched from a read mode to a write mode. At 512, a voltage based on the sensed location of the input is written by the controller 130 to generate an electrostatic output. The voltage may be written to an electrode located at or near the sensed location of the input. At 514, a decision is made whether to continue the method or end the method. If the method 500 is continued, the method 500 returns to 504 and another input on the surface 112 of the touch screen 110 is sensed with the sensor 118. If the method 500 is ended, the method 500 ends at 516.

Figure 6:
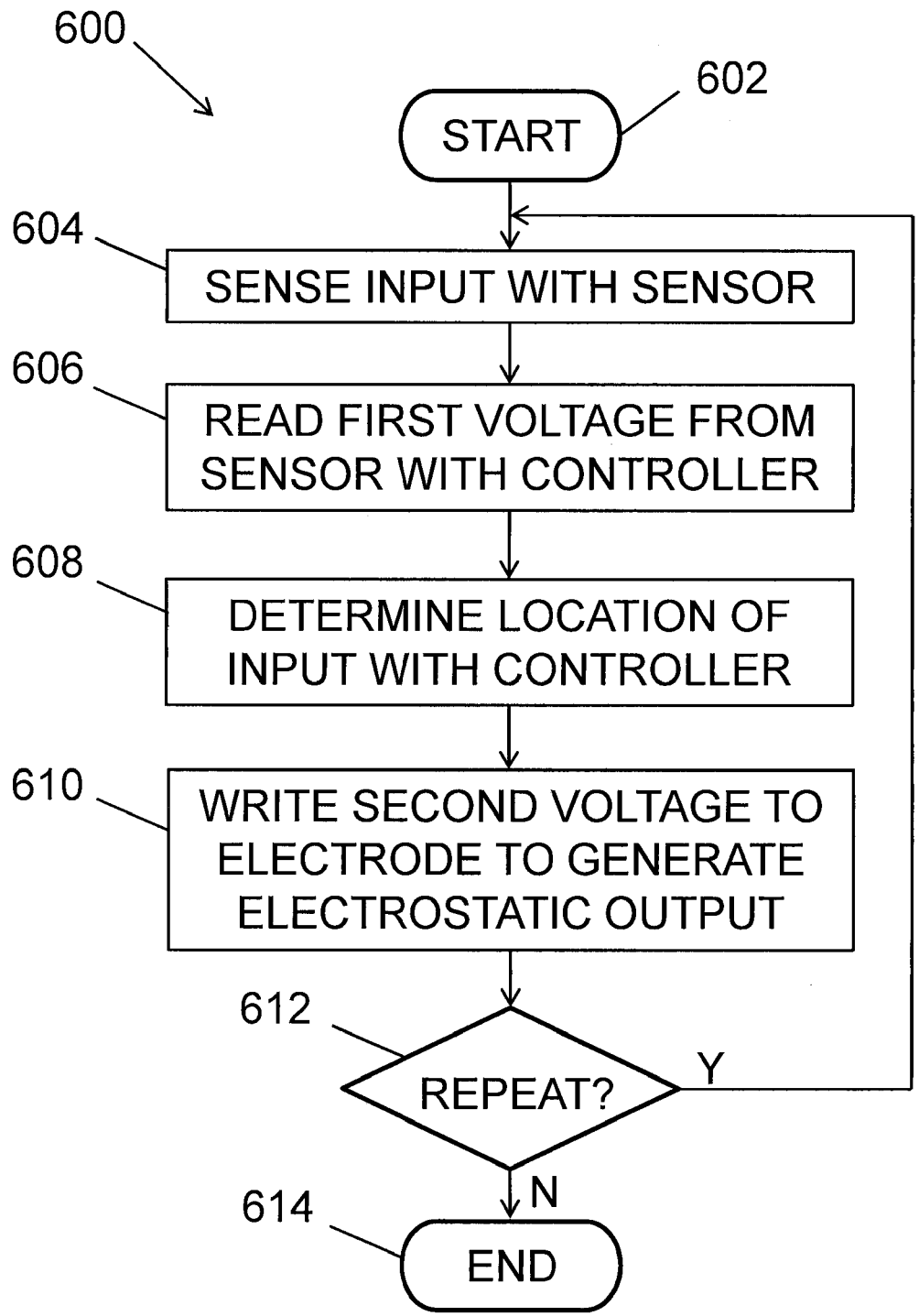
FIG. 6 is a flow diagram of a method for generating a haptic effect at a surface of a haptic output device.

FIG. 6 illustrates a method 600 for generating a haptic effect in a haptic output device in accordance with an embodiment of the invention. The method 600 begins at 602. At 604, an input on the surface 112 of the touch screen 110 is sensed with a sensor 118. At 606, a voltage is read from the sensor 118 that senses the input on the surface 112 of the touch screen 110 by the controller 130. At 608, the location of the input is determined by the controller 130. At 610, a voltage based on the sensed location of the input is written by the controller 130 to generate an electrostatic output. The voltage that is written by the controller 130 is about the same as the voltage that is read by the controller 130. At 612, a decision is made whether to continue the method or end the method. If the method 600 is continued, the method 600 returns to 604 and another input on the surface 112 of the touch screen 110 is sensed with the sensor 118. If the method 600 is ended, the method 600 ends at 614.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A haptic output device comprising:
   a capacitive touch screen having an insulating layer, wherein the insulating layer provides a surface of the capacitive touch screen;
   a conductive layer including a sensor configured to sense a touch input that is in contact with the surface of the capacitive touch screen of the haptic output device;
   one or more electrodes proximate the conductive layer; and
   a controller configured to
      read the sensor,
      identify a location of the touch input based on a reading of the sensor, and
      write a voltage to at least one electrode of the one or more electrodes based on the location of the touch input to generate an electrostatic output.

2. The haptic output device of claim 1, wherein the one or more electrodes are located in between the insulating layer and the conductive layer.

3. The haptic output device of claim 2, wherein the electrostatic output simulates a friction force or texture as the touch input moves on the surface of the capacitive touch screen, wherein the electrostatic output simulates the friction force or texture by sending an electric signal to an object from which the touch input is received.

4. The haptic output device of claim 2, wherein a strength of the electrostatic output is based on a thickness of the insulating layer that separates the one or more electrodes from an object in contact with the surface of the capacitive touch screen.

5. The haptic output device of claim 1, wherein the haptic output device is configured to multiplex between sensing the touch input and writing the voltage.

6. The haptic output device of claim 1, wherein the controller is configured to read the sensor in a reading mode, switch from the reading mode to a writing mode, and write the voltage in the writing mode.

7. The haptic output device of claim 6, wherein a timing for switching between the reading mode and the writing mode of the controller is based on a settling time of corresponding signals.

8. The haptic output device of claim 1, wherein a same voltage level is used for sensing the touch input and generating the electrostatic output.

9. The haptic output device of claim 1, wherein the controller is further configured to:
   read the sensor using a first voltage level;
   determine a first location based on the reading of the sensor using the first voltage level; and
   at the first location, read the sensor using a second voltage level, wherein the second voltage level is also used for generating the electrostatic output.

10. The haptic output device according to claim 1, wherein the controller is configured to write the voltage to electrodes that include the at least one electrode, wherein the one or more electrodes are proximate an entire surface of the capacitive touch screen.

11. The haptic output device according to claim 1, wherein the controller is configured to write the voltage to electrodes that include the at least one electrode, wherein the one or more electrodes are in an area proximate the location of the touch input.

12. The haptic output device according to claim 1, wherein the sensor is configured to sense a plurality of touch inputs at the surface of the capacitive touch screen, wherein the controller is configured to identify locations of the plurality of touch inputs on the surface.

13. The haptic output device according to claim 12, wherein the controller is configured to write the voltage to electrodes proximate the locations of the plurality of touch inputs to generate a plurality of localized electrostatic outputs.

14. The haptic output device according to claim 1, wherein the controller is configured to drive an electrode of the one or more electrodes that is closest to the location of the touch input to generate the electrostatic output.

15. The haptic output device according to claim 1, wherein the one or more electrodes comprise a plurality of electrodes, wherein the controller is configured to drive different electrodes of the plurality of electrodes to generate multi-touch localized electrostatic outputs.

16. A method comprising:
reading, by a controller in a reading mode, a sensor included in a conductive layer of a haptic output device, wherein the sensor senses a touch input that is in contact with the haptic output device, wherein the haptic output device further includes one or more electrodes proximate the conductive layer;
identifying, by the controller, a location of the touch input based on the reading of the sensor;
switching from the reading mode to a writing mode; and
writing, by the controller in the writing mode, a voltage to at least one electrode of the one or more electrodes based on the location of the touch input to generate an electrostatic output.

17. The haptic output device of claim 1, wherein the controller is configured to determine a contact area between the touch input and the at least one electrode of the one or more electrodes, and to cause a magnitude of the electrostatic output to be based on the contact area.

18. The method of claim 16, further comprising determining a contact area between the touch input and the at least one electrode of the one or more electrodes, wherein a magnitude of the electrostatic output is based on the contact area.

* * * * *